(12) United States Patent
Thomas et al.

(10) Patent No.: US 10,068,221 B1
(45) Date of Patent: Sep. 4, 2018

(54) USING A MOBILE COMPUTING DEVICE CAMERA TO TRIGGER STATE-BASED ACTIONS

(71) Applicant: WALGREEN CO., Deerfield, IL (US)

(72) Inventors: Gregory B. Thomas, Arlington Heights, IL (US); Nicholas L. Eby, Downers Grove, IL (US); Joseph M. Rago, Hinsdale, IL (US)

(73) Assignee: WALGREEN CO., Deerfield, IL (US)

( * ) Notice: Subject to any disclaimer, the term of this patent is extended or adjusted under 35 U.S.C. 154(b) by 957 days.

(21) Appl. No.: 14/526,887

(22) Filed: Oct. 29, 2014

(51) Int. Cl.
  *G06Q 20/32* (2012.01)
  *H04M 1/725* (2006.01)
  *H04W 4/04* (2009.01)

(52) U.S. Cl.
  CPC ...... *G06Q 20/322* (2013.01); *H04M 1/72527* (2013.01); *H04M 1/72569* (2013.01); *H04W 4/04* (2013.01)

(58) Field of Classification Search
  CPC ............ G06Q 20/322; H04M 1/72527; H04M 1/72569; H04W 4/04; G06F 9/4408; G06F 1/28; H04B 3/28; H04B 3/30; H04L 25/03
  See application file for complete search history.

(56) References Cited

U.S. PATENT DOCUMENTS

| | | | |
|---|---|---|---|
| 8,170,909 B2 | 5/2012 | Brown et al. | |
| 9,002,375 B1 | 4/2015 | Lerner et al. | |
| 9,264,151 B1 | 2/2016 | Emigh et al. | |
| 9,824,323 B1 | 11/2017 | Weiss et al. | |
| 2007/0184852 A1 | 8/2007 | Johnson et al. | |
| 2008/0097769 A1 | 4/2008 | Galvin et al. | |
| 2008/0149721 A1 | 6/2008 | Shadwell | |
| 2008/0255929 A1 | 10/2008 | Mouton | |
| 2009/0112683 A1 | 4/2009 | Hamilton, II et al. | |
| 2010/0038416 A1 | 2/2010 | Canora | |
| 2010/0159980 A1* | 6/2010 | Mikan | H04M 1/22 455/556.1 |

(Continued)

OTHER PUBLICATIONS

U.S. Appl. No. 14/456,713, Advisory Action, dated May 19, 2017.

(Continued)

*Primary Examiner* — Sonji Johnson
(74) *Attorney, Agent, or Firm* — Marshall, Gerstein & Borun LLP; Randall G. Rueth

(57) ABSTRACT

Methods, systems, apparatus, and non-transitory media are disclosed to perform state-based changes on a mobile computing device. A mobile computing device may display one or more images that are indicative of a state of the mobile computing device, such as a barcode. A mobile computing device may measure characteristics of electromagnetic (EM) radiation, such as laser light from a laser scanner, received through its camera. By comparing changes in the intensity of the EM radiation over a time interval and/or a wavelength of the EM radiation to one or more threshold intensities and/or wavelength ranges, one or more trigger conditions may be identified. The one or more trigger conditions may cause the mobile computing device to execute one or more actions, which may be dependent on the present state of the mobile computing device. The actions may include various functions used in conjunction with a retailer-based mobile phone application.

43 Claims, 8 Drawing Sheets

(56) References Cited

U.S. PATENT DOCUMENTS

| | | |
|---|---|---|
| 2010/0161356 A1 | 6/2010 | Louie et al. |
| 2010/0280911 A1 | 11/2010 | Roberts et al. |
| 2011/0028161 A1 | 2/2011 | Larsen |
| 2012/0023171 A1* | 1/2012 | Redmond ............ H04M 1/7253 709/205 |
| 2012/0115512 A1 | 5/2012 | Grainger et al. |
| 2013/0006663 A1 | 1/2013 | Bertha et al. |
| 2013/0006718 A1 | 1/2013 | Nielsen et al. |
| 2013/0226704 A1 | 8/2013 | Fernandez |
| 2013/0317944 A1 | 11/2013 | Huang et al. |
| 2014/0054381 A1 | 2/2014 | Cha et al. |
| 2014/0089111 A1 | 3/2014 | Fernandez |
| 2014/0143060 A1 | 5/2014 | Fernandez |
| 2014/0180817 A1 | 6/2014 | Zilkha |
| 2014/0200937 A1 | 7/2014 | Friedman |
| 2014/0279541 A1 | 9/2014 | Castrechini et al. |
| 2014/0351033 A1 | 11/2014 | Azevedo |
| 2014/0365304 A1 | 12/2014 | Showers et al. |
| 2015/0095161 A1 | 4/2015 | Goel |
| 2015/0112774 A1 | 4/2015 | Georgoff et al. |
| 2015/0134429 A1 | 5/2015 | Katakwar et al. |
| 2015/0178798 A1 | 6/2015 | Garforth-Bles |
| 2015/0221010 A1 | 8/2015 | Ming |
| 2015/0227949 A1 | 8/2015 | Sangani |
| 2015/0294084 A1 | 10/2015 | McCauley et al. |
| 2015/0363816 A1 | 12/2015 | Poglitsch |
| 2017/0046753 A1 | 2/2017 | Deupree, IV |

OTHER PUBLICATIONS

U.S. Appl. No. 14/456,713, Final Office Action, dated Mar. 10, 2017.

U.S. Appl. No. 14/456,713, Nonfinal Office Action, dated Dec. 1, 2016.

U.S. Appl. No. 14/456,713, Notice of Allowance, dated Jul. 3, 2017.

U.S. Appl. No. 15/717,506, filed Sep. 27, 2017.

* cited by examiner

USING A MOBILE COMPUTING DEVICE CAMERA TO TRIGGER STATE-BASED ACTIONS

TECHNICAL FIELD

The present disclosure generally relates to systems, methods, apparatus, and non-transitory computer readable media for detecting electromagnetic radiation using a camera associated with a mobile computing device, and more specifically, for triggering one or more actions based upon a state of the mobile computing device in response to such detection.

BACKGROUND

The use of mobile computing device applications in the retail store environment has brought a new level of convenience to both shoppers and retailers. Retailers may design customized applications, or "apps," that are downloaded to a mobile computing device and used to improve the customer's shopping experience. For example, a customer may use a retailer's application to collect and display coupons that may be scanned at a point of sale (POS) instead of presenting paper coupons.

However, present retailer applications are limited with regards to detecting feedback other than customer interactions. Present retailer applications do not rely on which application features are being used by a customer at a given time or otherwise consider the state of the mobile computing device as the customer navigates through various application features. Conventional applications, as a result, perform predetermined actions as selected by the customer, and do not typically modify a customer's navigation through the application based on any additional feedback. As a result, traditional applications are executed in a linear sense, whereby a customer selects an action manually and the application performs a function related to the customer's selected action. If the customer wants to use more than one type of application feature, then the customer needs to select each action individually and wait until the application has completed each one. In other words, traditional applications lack a means to intelligently and automatically navigate the customer through various functions of the application.

Furthermore, when scanning coupons or other barcode presented at a POS, many laser scanner systems have difficulty scanning barcodes displayed on mobile computing device screens. Conventional applications do not change their display state upon being scanned in such a manner, which may lead to added frustration as the employee repeatedly attempts to scan the same barcode image. Additionally, because the barcodes may be difficult to scan, store employees are more likely to take the customer's phone to attempt to scan the displayed barcode themselves, which may increase the risk that a mobile phone may be dropped or otherwise damaged by the store employee, causing the store to be liable for repair or replacement of the damaged phone.

Therefore, implementing applications that trigger state-based changes of the mobile computing device are useful but present several challenges.

SUMMARY

In some embodiments, methods, systems, apparatus, and non-transitory media are disclosed to perform state-based changes on a mobile computing device. A mobile computing device may display one or more images that are indicative of a state of the mobile computing device, such as a barcode image. The mobile computing device may measure changes in intensity of electromagnetic (EM) radiation over a time interval, such as laser light from a laser scanner, coupled through its camera. By comparing the measured changes in EM radiation intensity to a threshold value, one or more trigger conditions may be identified. Upon identification of the one or more trigger conditions, the mobile computing device may execute one or more actions, which may be dependent on the present state of the mobile computing device. The actions may include various functions used in conjunction with a retailer-based mobile phone application In additional embodiments, the state of the mobile computing device may include a location of the mobile computing device or other factors. In such embodiments, the mobile computing device may execute actions based upon the image displayed on the mobile computing device and the location of the mobile computing device when the trigger condition is identified. These state-based changes may allow a retailer to customize what is displayed to a customer using the mobile phone application at different store locations.

In additional embodiments, the trigger condition may be identified based upon the measured changes in EM radiation intensity as well as whether a measured wavelength of the EM radiation is within a predetermined wavelength range. By tailoring what constitutes a trigger condition in this way, the mobile computing device may execute different actions in response to different types of measured EM radiation.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure therein, that numerous alternative embodiments could be implemented.

Although the embodiments described throughout the disclosure are explained in the context of a retail store, other embodiments of the present disclosure include non-retail contexts as well. For example, in some embodiments, the actions executed upon identification of one or more trigger conditions may be related to evaluations or surveys in a non-retail context.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1:
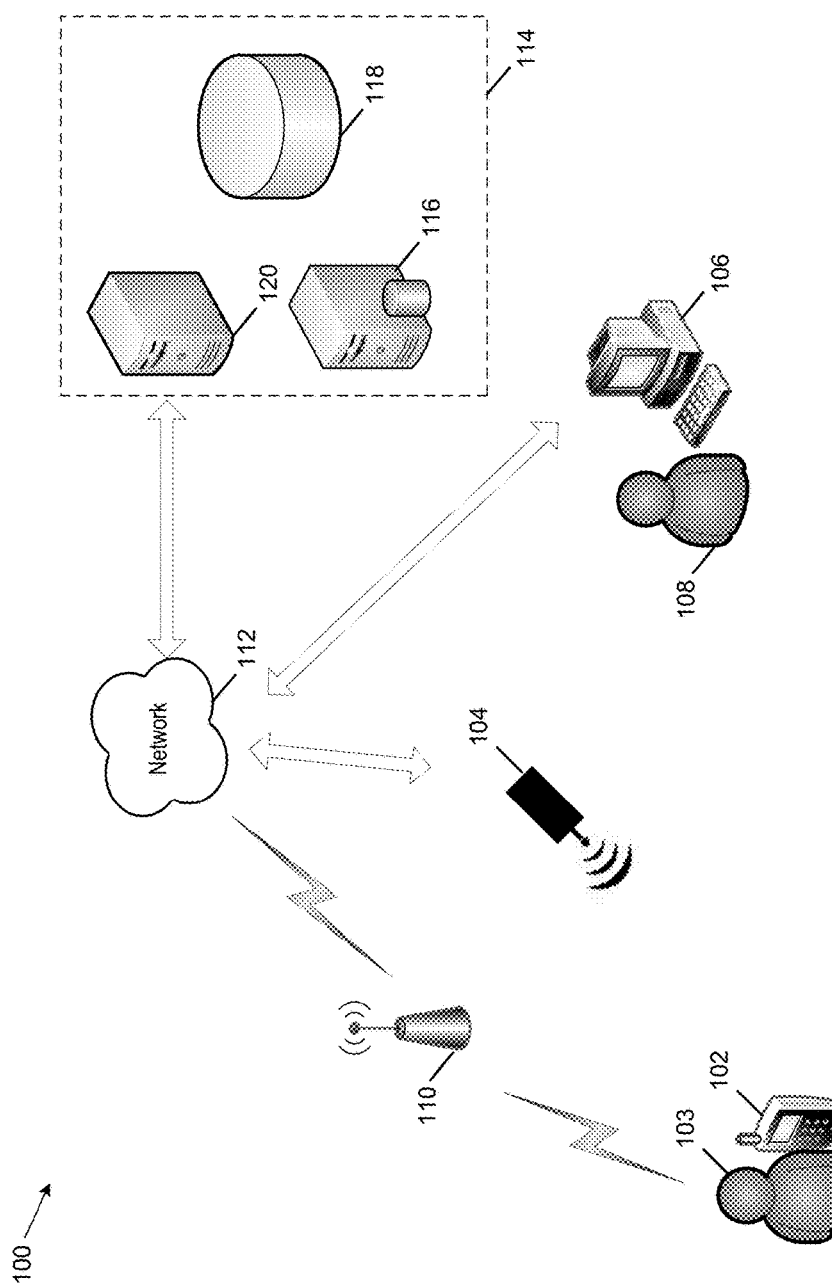
FIG. 1 illustrates a block diagram of an exemplary system 100 according to an embodiment.

FIG. 1 illustrates a block diagram of an exemplary system 100 according to an embodiment. Exemplary system 100 includes a mobile computing device 102, which may be used by or otherwise associated with a user 103, an electromagnetic (EM) radiation source 104, a point of sale (POS) 106, which may be operated by a user 108, such as a store cashier, for example, a network 112, a base station 110, and back-end components 114.

As will be appreciated by those of ordinary skill in the relevant art(s), loyalty reward programs are often used by retailers to maintain customer relationships. Loyalty reward programs may use a point-based system in exchange for customer purchases or other types of activities promoted by the retailer. The customer may exchange reward points accrued from these purchases and/or participation in these activities for discounts, goods, or services offered by the retailer. Furthermore, the retailer may associate the reward points accrued by the customer and/or a history of purchases and/or activities associated with the allocation of the reward points as part of a customer's profile information.

In the context of a retail store, a retailer may design an application that is downloaded, installed, and executed on mobile computing device 102 by a user 103. In such a case, user 103 may be a retail customer. As will be appreciated by those of ordinary skill in the relevant art(s), the application installed on mobile computing device 102 may allow the customer to use mobile computing device 102 to perform various functions in the context of a retail store environment. For example, mobile computing device 102 may execute the retailer's application and select one or more corresponding icons that represent respective application functions. The application may display one or more images in response to receiving this user input, such as barcode images that may represent coupon codes and/or loyalty reward identification information, payment information, display promotional information, prompt the customer to answer survey questions, request participation in a digital receipt program, provide feedback regarding the application itself, request charitable donations from the customer, etc.

Mobile computing device 102 may be configured to communicate with back-end components 114 via network 112 and base station 110. As will be appreciated by those of ordinary skill in the relevant art(s), mobile computing device 102 may be implemented with any suitable number of power sources, wireless transmitters, receivers, and/or transceivers, processors, memories, etc., to facilitate this functionality. Mobile computing device 102 may be configured to communicate with base station 110 via any suitable communications protocol to access network 112 and/or back-end components 114, such as via cellular and/or Wi-Fi protocols, for example.

In an embodiment, mobile computing device 102 may be implemented as a user equipment (UE), such as a smartphone, for example. Although mobile computing device 102 is illustrated in FIG. 1 as a phone, mobile computing device 102 may be implemented as any suitable communication device configured to communicate with back-end components 114 via network 112 and base station 110. For example, mobile computing device 102 may be implemented as a personal digital assistant (PDA), a tablet computer, a laptop computer, a wearable electronic device, etc.

Base station 110 may be configured to facilitate communications between mobile computing device 102 and network 112. Although base station 110 is illustrated in FIG. 1 as wirelessly communicating with network 112, embodiments include mobile computing device 102 supporting communications between base station 110 and network 112 via any suitable number of wired and/or wireless links. For example, base station 110 may be coupled to network 112 via one or more landline, Internet Service Provider (ISP) backbone connections, satellite links, a public switched telephone network (PSTN), etc. In various embodiments, base station 110 may be implemented as an access point (AP), a macrocell, a femtocell, etc.

Network 112 may be configured as any suitable network configured to facilitate communications between mobile computing device 102 and back-end components 114. Network 112 may include, for example, a proprietary network, a secure public internet, a mobile-based network, a virtual private network, etc. Network 112 may include any suitable number of interconnected network components that form an aggregate network system, such as dedicated access lines, plain ordinary telephone lines, satellite links, cellular base stations, a public switched telephone network (PSTN), etc., or any suitable combination thereof. In some embodiments, network 112 may facilitate mobile computing device 102 connecting to the Internet, and in such embodiments mobile computing device 102 may be referred to as a web-enabled mobile computing device. In embodiments in which network 112 facilitates a connection to the Internet, data communications may take place over network 112 via one or more suitable Internet communication protocols. As will be appreciated by those of ordinary skill in the relevant art(s), network 112 may be implemented as a wireless telephony network (e.g., GSM, CDMA, LTE, etc.), a Wi-Fi network (e.g., via one or more IEEE 802.11 Standards), a WiMAX network, a Bluetooth network, etc.

Back-end components 114 may include any suitable number of components configured to receive data from and send data to mobile computing device 102, EM source 104, and/or POS 106 via network 112. In various embodiments, back-end components 114 may be configured to execute one or more applications to facilitate one or more aspects of the functionality used in accordance with one or more embodiments as discussed herein. Back-end components 114 may include one or more external computing devices such as database servers 116, databases 118, and/or servers 120. Although FIG. 1 illustrates back-end components 114 as including only three different types of back-end components, those of ordinary skill in the relevant art(s) will appreciate that back-end components 114 may include any suitable number and type of back-end components to facilitate the appropriate functions of the embodiments as described herein.

For example, database server 116 may be implemented as any suitable number of servers that are configured to access data from database 118, which may store data such as customer profile information. To provide another example, server 120 may be implemented as any suitable number of web servers configured to provide Internet communications to mobile computing device 102 and/or to support one or more applications installed on mobile computing device 102. As will be appreciated by those of ordinary skill in the relevant art(s), back end components 114 may store and/or access secure data that is of a private, proprietary, and/or sensitive nature. As a result, various embodiments of back end components 114, network 112, and/or device 102 may implement appropriate security protocols such as encryption, secure links, network authentication, firewalls, etc., to appropriately protect such secure data.

Database 118 may be configured to store any suitable relevant data as described in the embodiments presented herein related to the operation of exemplary system 100. Such data might include, for example, customer profile information, payment information, answers submitted by a customer to one or more surveys, loyalty reward data, customer prescription information, etc. To provide additional examples, data stored in database 118 may include stock and/or inventory information, stock keeping units (SKUs), price information, store information such as store locations, store numbers, etc. One or more of back-end components 114 may communicate with database 118 to store data to and/or read data from database 118 as needed to facilitate the appropriate functions of the embodiments as described herein.

In various embodiments, the customer profile information may include data that may be entered by a customer and data that may be added through a customer's interaction with various functions associated with of exemplary system 100, which will be further discussed below. For example, a customer may initially create a portion of a customer profile upon installation of the application, through a registration process via a website, over the phone, etc. This initial customer profile may include information, for example, such as the customer's contact information, forms of payment (e.g., credit card numbers), etc. Once created, additional data may be later added to the customer profile such as reward points, coupons, promotions, survey answers, etc., as the customer interacts with the application in accordance with the various embodiments as described herein.

POS 106 may be configured to communicate with back-end components 114. Although FIG. 1 illustrates POS 106 as connecting to back-end components 114 via network 112, various embodiments include checkout system 114 being connected to back-end components 114 via networks separate from network 112. Networks separate from network 112 are not shown in FIG. 1 for purposes of brevity. POS 106 may be configured to send data to back-end components 114, such as rewards program information, payment information, etc. In various embodiments, checkout system 114 may access back-end components 114 to perform functions, for example, such as determining pricing information, determining a number of customer rewards points associated with the customer's profile information, determining available discounts, running reports, determining store inventory, processing payments, etc.

POS 106 may be configured to utilize a laser scanner to facilitate a checkout process. For example, as will be appreciated by those of ordinary skill in the relevant art(s), POS 106 may utilize a laser scanner to scan one or more barcodes associated with products to be purchased by customer 103. In some embodiments, the laser scanner used at POS 106 may be implemented as EM source 104. In other embodiments, the laser scanner used at POS 106 may be implemented as a laser scanner separate from EM source 104. Laser scanners in addition to EM source 104 are not shown in FIG. 1 for purposes of brevity.

In addition to scanning barcodes associated with products to be purchased by customer 103, POS 106 may use a laser scanner to scan one or more images displayed on mobile computing device 102. For example, instead of presenting a paper coupon having a barcode that would be scanned at POS 106 by a laser scanner, mobile computing device 102 may display the coupon barcode image on a display associated with mobile computing device 102, which may be scanned by a laser scanner in the same manner as a paper coupon barcode. In some embodiments, POS 106 may communicate with back-end components 114 to indicate that the coupon has been used and/or to update the customer's profile information stored in back-end components 114.

To provide another example, mobile computing device 102 may display an image representative of a loyalty rewards account number as a barcode. In such embodiments, POS 106 may communicate with back-end components 114 regarding the items purchased such that an appropriate number of reward points may be credited to the customer's profile.

To provide yet another example, mobile computing device 102 may display an image representative of a form of payment such that a payment is processed in accordance with the form of payment associated with the customer's profile information when scanned by a laser scanner at POS 106.

EM source 104 may be configured as any suitable device that emits EM radiation that may be utilized in conjunction with mobile computing device 102 and/or POS 106. For example, EM source 104 may be implemented as a laser scanner, an infrared emitter, a near field communications (NFC) reader system, a radio frequency identification (RFID) reader system, etc. EM source 104 may be configured to communicate with back-end components 114. Although FIG. 1 illustrates EM source 104 as communicating with back-end components 114 via network 112, various embodiments include EM source 104 being connected to back-end components 114 via networks separate from network 112. Networks separate from network 112 are not shown in FIG. 1 for purposes of brevity. EM source 104 may be configured to send data to back-end components 114, such as coupon information, rewards program information, etc. In various embodiments, EM source 104 may access back-end components 114 to perform functions, for example, similar or identical to those performed by POS 106, such as determining pricing information, determining a number of customer rewards points associated with the customer's profile information, determining available discounts, running reports, determining store inventory, processing payments, etc.

In embodiments in which EM source 104 is not associated with POS 106, EM source 104 may be located at another location in a retail store separate from POS 106. For example, EM source 104 may be implemented as a portable laser scanner carried by a store employee or a third-party promoter of merchandise sold in the retail store. Again, coupons may be digitally stored as part of a customer profile and may be linked to a customer's loyalty rewards number, which may be displayed on mobile computing device 102 as an image. Therefore, in some embodiments, customer 103 may receive coupons by adding coupons to his customer profile. To provide an illustrative example, while shopping at a retail store, customer 103 may display his loyalty rewards card information on mobile computing device 102, which may then be scanned by EM source 104. Continuing this example, EM source 104 may communicate with back-end components 114 to add one or more offered coupons, promotions, discounts, etc., to the customer's profile. Upon customer 103 subsequently paying for an item for which the coupon is offered, customer 103 may display the coupon as an image on mobile computing device 102 at POS 106. POS 106 may then communicate with back-end components 114 to verify the coupon, deduct the coupon amount from the purchase price, process payments, and indicate that the coupon associated with the customer's account is marked as used.

Mobile computing device 102 may be configured to detect, measure, and/or one or more characteristics of EM radiation emitted by EM radiation source 104 and to identify a trigger condition based upon the one or more characteristics. For example, mobile computing device 102 may identify a trigger condition when the change in EM radiation received at mobile computing device 102 over a time interval exceeds a threshold intensity, when the measured EM radiation wavelength falls within a range of wavelengths, etc. In an embodiment, mobile computing device 102 may be configured to detect, measure, monitor, and/or identify one or more characteristics of EM radiation emitted from EM radiation source 104 via a camera that is integrated as part of, or otherwise associated with, mobile computing device 102.

Mobile computing device 102 may be configured to execute one or more installed applications in accordance with the various embodiments described herein. Again, mobile computing device 104 may be configured to display one or more images such as coupons, loyalty reward information, etc. Because these images are indicative of a present mobile computing device application function, the displayed images are said to represent a "state" of mobile computing device 102. As further discussed below, however, the state of the mobile computing device may additionally or alternatively depend on additional factors, such as the location of the mobile computing device, for example.

To provide an illustrative example, one state of mobile computing device 102 may be represented as one or more barcode images displayed on mobile computing device 102 such as a loyalty rewards barcode image, a coupon barcode image, etc. Continuing this example and assuming that the EM radiation is associated with a laser scanner, mobile computing device 102 may identify a trigger condition when mobile computing device 102 is scanned by the laser scanner causing a change in an intensity of laser light over a time interval that is above a threshold intensity and/or when the laser light wavelength is within a predetermined range of wavelengths.

In various embodiments, mobile computing device 102 may be configured to execute one or more actions upon identification of the trigger condition. In some embodiments, upon identifying a trigger condition, mobile computing device 102, may execute an action based on the state of mobile computing device 102. In other words, mobile computing device 102 may execute a first action when a trigger condition is detected and mobile computing device 102 is displaying an image indicative of a first state of mobile computing device 102, and a second action when the trigger condition is detected and mobile computing device 102 is displaying an image indicative of a second state of mobile computing device 102.

In other embodiments, mobile computing device 102 may execute one or more actions based upon additional characteristics of mobile computing device 102, such as a current location of mobile computing device 102, or a combination of images displayed on mobile computing device 102 and a current location of mobile computing device 102. For example, mobile computing device 102 may execute a first action when a trigger condition is detected and mobile computing device 102 is at a first location and a second action when the trigger condition is detected and mobile computing device 102 at a second location.

In some embodiments, mobile computing device 102 may be configured to identify a single trigger condition, even though one or more different actions may be executed upon identification of the trigger condition based upon a particular state of mobile computing device 102. In other embodiments, however, mobile computing device 102 may be configured to identify two or more trigger conditions. In accordance with such embodiments, mobile computing device 102 may be configured to execute a first action based upon the identification of a first trigger condition and a state of mobile computing device 102, and a second, different action based upon the identification of a second trigger condition and a state of mobile computing device 102.

In some embodiments, mobile computing device 102 may be configured to detect different types of EM radiation from more than one type of EM source. For purposes of brevity, a single EM source 104 is illustrated in FIG. 1. However, in some embodiments, mobile computing device 102 may be configured to identify a first trigger condition when a change in an intensity of a first type of EM radiation (e.g., red laser light) over a time interval exceeds a first threshold and is within a first range of wavelengths and a second trigger condition when a change in an intensity of a second type of EM radiation (e.g., green laser light, infrared, NFC, etc.) exceeds a second threshold and is within a second range of wavelengths. In accordance with these embodiments, mobile computing device 102 may be configured to execute different actions based upon each separate identifiable trigger condition and the state of mobile computing device 102. As will be appreciated by those of ordinary skill in the relevant art(s), based upon the particular type of each EM source and desired action to be executed, the first and the second threshold may have the same intensity threshold value or have different threshold values.

In other embodiments, mobile computing device 102 may be configured to identify more than one trigger condition from a single EM radiation source. For example, mobile computing device 102 may be configured to compare the changes in intensity of EM radiation over a time interval to more than one intensity threshold, such as a first intensity threshold and a second, larger intensity threshold. Continuing this example, mobile computing device 102 may identify a first trigger condition when EM radiation is received having a change in measured intensity greater than only the first intensity threshold, and may identify a second trigger condition when EM radiation is received having a change in measured intensity greater than both the first and the second intensity threshold. These embodiments may be particularly useful, when, for example, mobile computing device 102 has a single camera to measure EM radiation characteristics and more than one image is displayed on mobile computing device 102 at a time. Mobile computing device 102 may identify each separate trigger condition as each separate image is scanned by a laser scanner, for example, since one displayed image may be closer to the camera than the other. In accordance with such embodiments, mobile computing device 102 may be configured to perform different types of actions upon identification of each respective first and second trigger condition and the state of mobile computing device 102.

The one or more actions executed by mobile computing device 102 may be any suitable relevant action that a retailer may utilize as one or more functions performed by mobile computing device 102 in conjunction with execution of an application. For example, the one or more actions may include actions associated with one or more payment-related activities. Examples of payment related activities may include promotional offers being displayed, a request for a customer to complete a survey, a request for the customer to donate reward points (or money) to a third party and/or a charitable organization, a request for a customer to redeem reward points, a request for the customer to select a form of payment, etc. To provide additional examples, the one or more actions may include actions associated with requests for the customer to participate in a digital receipt program, requests for the customer to complete a survey regarding her shopping experience, etc.

Figure 2:
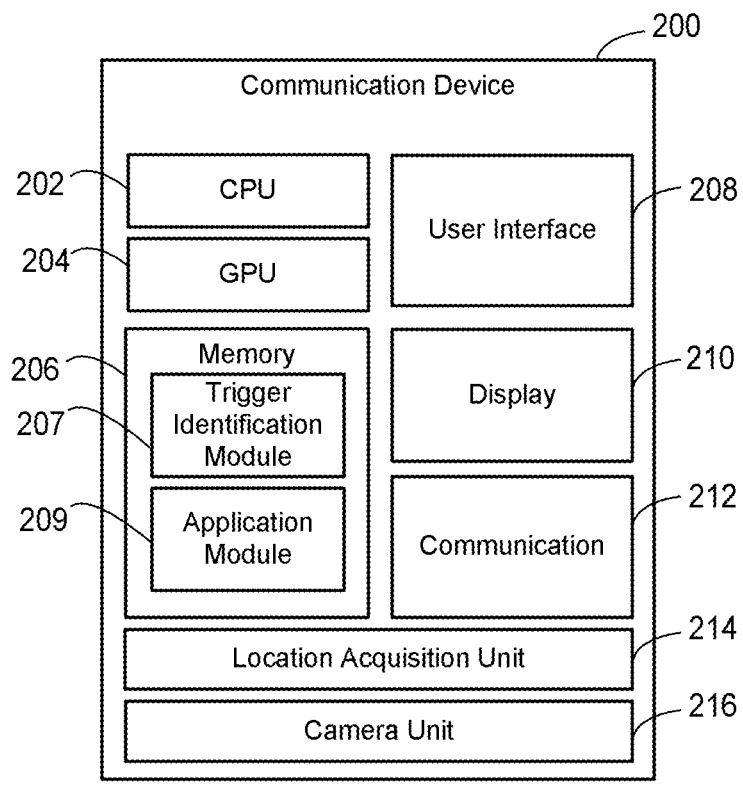
FIG. 2 illustrates a block diagram of an exemplary mobile computing device 200 according to an embodiment.

FIG. 2 illustrates a block diagram of an exemplary mobile computing device 200 according to an embodiment. In an embodiment, mobile computing device 200 may be an implementation of mobile computing device 102, for example, as shown in FIG. 1. Mobile computing device 200 may include a central processing unit (CPU) 202, a graphics processing unit (GPU) 204, a memory 206, a user interface 208, a display 210, a communications unit 212, a location acquisition unit 214, and a camera unit 216.

CPU 202 and/or GPU 204 may be configured to communicate with memory 206 to store to and read data from memory 206. In accordance with various embodiments, memory 206 is a computer-readable non-transitory storage device that may include any combination of volatile (e.g., a random access memory (RAM), or a non-volatile memory (e.g., battery-backed RAM, FLASH, etc.). Memory 206 may be configured to store instructions executable on CPU 202 and/or GPU 204. These instructions may include machine readable instructions that, when executed by CPU 204 and/or GPU 204, cause CPU 202 and/or GPU 204 to perform various acts. Memory 206 may also be configured to store any other data, for example, such as data similar or identical to that stored on back-end components 114, such as locations, store numbers, customer profile information, etc.

Trigger identification module 207 is a portion of memory 206 configured to store instructions, that when executed by CPU 202 and/or GPU 204, cause CPU 202 and/or GPU 204 to identify any suitable number of trigger conditions based upon one or more characteristics of EM radiation coupled via camera unit 216, which is further discussed below. For example, in some embodiments, instructions stored in trigger identification module 207 may facilitate CPU 204 and/or GPU 204 measuring a change in an intensity of laser light over an interval of time that is coupled through a lens of camera unit 216. If the measured change in intensity over the time interval is above one or more intensity threshold values, then CPU 202 may identify this as a trigger condition.

To provide another example, in other embodiments, instructions stored in trigger identification module 207 may facilitate CPU 204 and/or GPU 204 measuring a wavelength of laser light that is coupled through a lens of camera unit 216. Again, if the measured wavelength of laser light is between a predetermined range of wavelengths, then CPU 202 may identify this as a trigger condition.

To provide yet another example, in still additional embodiments, instructions stored in trigger identification module 207 may facilitate CPU 204 and/or GPU 204 measuring both the change in an intensity of laser light over an interval of time and a wavelength of laser light that is coupled through a lens of camera unit 216. In accordance with such embodiments, if both the change in intensity over the time interval is above one or more intensity threshold values and the measured wavelength of laser light is between a predetermined range of wavelengths, then CPU 202 may identify this as a trigger condition.

As will be appreciated by those of ordinary skill in the relevant art(s), trigger identification module 207 may include instructions specifying any suitable time interval, such as a predetermined time interval, a time interval that is based upon the measured wavelength of EM radiation, etc.

Trigger identification module 207 may include instructions that facilitate the identification of more than one trigger condition based on a comparison of the measured EM radiation characteristics to more than one threshold intensity and/or to a range of wavelengths. As will be appreciated by those of ordinary skill in the relevant art(s), CPU 202 and/or GPU 204 may access instructions stored in trigger identification module 207 to implement any suitable number of routines, algorithms, applications, programs, etc., to facilitate the functionality as described herein with respect to the applicable embodiments.

Application module 209 is a portion of memory 206 configured to store instructions, that when executed by CPU 202 and/or GPU 204, cause CPU 202 and/or GPU 204 to perform various acts in accordance with an applicable embodiments as described herein. For example, in various embodiments, instructions stored in application module 209 may facilitate CPU 204 and/or GPU 204 performing functions such as, for example, displaying one or more interactive icons via display 210, displaying one or more images indicative of a state of mobile computing device 200, receiving user input via user interface 208, determining a state of mobile computing device 200, determining one or more actions to execute in response to one or more trigger conditions being identified, executing one or more actions upon identification of one or more trigger conditions, communicating with external computing devices (e.g., back-end components 114), etc. As will be appreciated by those of ordinary skill in the relevant art(s), CPU 202 and/or GPU 204 may access instructions stored in application module 209 to implement any suitable number of routines, algorithms, applications, programs, etc., to facilitate the functionality as described herein with respect to the applicable embodiments.

In some embodiments, the information and/or instructions stored in trigger identification module 207 and/or application module 209 may be setup upon the initial installation of a corresponding application. In such embodiments, the application may be installed in addition to an operating system implemented by mobile computing device 200. For example, a user may download and install the application from an application store via communication unit 212 in conjunction with user interface 208. Application stores could include, for example, Apple Inc.'s App Store, Google Inc.'s Google Play, Microsoft Inc.'s Windows Phone Store, etc., depending on the operating system implemented by mobile computing device 200.

In other embodiments, the information and/or instructions stored in trigger identification module 207 and/or application module 209 may be integrated as a part of the operating system implemented by mobile computing device 200. For example, a user could setup the application via an initial setup procedure upon initialization of mobile computing device 200, as part of setting up a new user account on mobile computing device 200, etc.

Trigger identification module 207 and/or application module 209 may run as foreground processes, as background processes, or any suitable combination thereof. For example, in foreground process embodiments, a user may launch, or execute, an application associated with application module 209 by manually selecting a corresponding icon displayed on display 210 using an appropriate gesture, such as tapping his finger on an interactive portion of display 210 to open the application. Upon launching the application in this way, mobile computing device 200 may then identify trigger conditions upon being exposed to EM radiation resulting in the appropriate measured characteristics, such as changes in intensity and/or a wavelength that is within a predetermined range, for example.

However, in background process embodiments, an application associated with application 209 may run once installed (or shortly thereafter, e.g., 4 or 5 seconds) without necessarily being manually launched by the user. In accordance with such embodiments, trigger identification module 207 may run as a background process, continually measuring and/or monitoring EM radiation coupled via camera unit 216. Upon identification of one or more trigger conditions, application module 209 may execute one or more actions on mobile computing device 200 based upon the state of mobile computing device 200 when the one or more trigger conditions were identified.

In accordance with various embodiments, trigger identification module 207 and/or application module 209 may include instructions to allow CPU 202 and/or GPU 204 to modify one or more settings, parameters, and/or characteristics of mobile computing device 200. For example, as will be appreciated by those of ordinary skill in the relevant art(s), in embodiments in which EM radiation characteristics are continually monitored and/or measured, mobile computing device 200 may consume more power than embodiments in which the application is manually launched by a user. As a result, embodiments in which EM radiation characteristics are continually monitored and/or measured may more quickly drain a battery or other suitable power supply used by mobile computing device 200.

To provide an illustrative example, application module 209 may attempt to offset this increased power usage by including instructions that cause CPU 202 and/or GPU 204 to decrease a resolution setting of camera unit 216 to a lower quality (e.g., video graphics array (VGA) resolution) which may consume less power than higher resolution settings. Because camera unit 216 is used to measure coupled EM radiation characteristics as opposed to images, decreasing the resolution of camera unit 216 in this way provides an acceptable tradeoff.

To provide another example, in embodiments in which the application is manually launched by a user, application module 209 may include instructions that cause CPU 202 and/or GPU 204 to adjust one or more display settings associated with display 210. These display setting may be adjusted upon display 210 initially displaying one or more images that may then be scanned by a laser scanner or in response to one or more trigger conditions being identified. To provide an illustrative example, display 210 may have default display settings of a certain contrast, brightness, resolution, etc. Upon the application being launched and a barcode being displayed on display 210, CPU 202 and/or GPU 204 may execute instructions stored in application module 209 to adjust these default display settings such that the contrast is increased, the brightness is increased, etc.

To provide another example, upon the application being launched and a barcode being displayed on display 210, CPU 202 and/or GPU 204 may execute instructions stored in application module 209 to initially display the barcode in accordance with a first set of display settings (e.g., default settings). Then, upon identifying one or more trigger conditions, CPU 202 and/or GPU 204 may adjust the initial display settings such that the contrast is increased, the brightness is increased, portions of the image besides the barcode are darkened or deemphasized while the barcode is brightened or more prominently displayed, etc. As will be appreciated by those of ordinary skill in the relevant art(s), adjusting the settings of display 210 in this manner may allow a laser scanner to more easily scan a displayed barcode image.

User interface 208 may be configured to allow a user to interact with mobile computing device 200. For example, user interface 210 may include a user-input device such as an interactive portion of display 210 (e.g., a "soft" keyboard displayed on display 210), an external hardware keyboard configured to communicate with mobile computing device 200 via a wired or a wireless connection (e.g., a Bluetooth keyboard), an external mouse, and/or any other suitable user-input device. User interface 208 may include a microphone configured to receive user input in the form of voice input, such as voice commands, for example. In some aspects, voice commands received via user interface 208 may be converted to text, for example, via CPU 202. In this way, user interface 208 may allow a user to enter text in lieu of typing in text by hand.

Display 210 may be implemented as any suitable type of display that may facilitate user interaction, such as a capacitive touch screen display, a resistive touch screen display, etc. In various aspects, display 210 may be configured to work in conjunction with user-interface 208, CPU 202, and/or GPU 204 to detect user inputs upon a user selecting a displayed interactive icon or other graphic, to identify user selections of objects displayed via display 210, etc.

In various embodiments, display 210 may be configured to display one or more images indicative of a state of mobile computing device 200, as previously discussed. Display 210 may be configured to display one or more images in accordance with any suitable number of display settings. Again, these display settings may include, for example, a particular level of contrast, brightness, resolution, etc. Display 210 may be configured to display certain types of images using different settings than others. For example, barcode images may be displayed having a higher contrast and/or brightness setting than images asking for customer feedback. In this way, display 210 may adjust the display settings based upon a current state of mobile computing device 200.

Communication unit 212 may be configured to facilitate communications between mobile computing device 200 and one or more external computing devices, such as back-end components 114, for example, as shown in FIG. 1. Communication unit 212 may be implemented with any combination of suitable hardware and/or software and may utilize any suitable communication protocol and/or network (e.g., network 112) to facilitate this functionality. For example, communication unit 212 may be implemented with any number of wired and/or wireless transceivers, network interfaces, physical layers, etc., to facilitate communications for mobile computing device 200 such as cellular communications, Wi-Fi communications, BLUETOOTH communications, NFC, RFID communications, etc.

Location acquisition unit 214 may be configured to utilize any suitable communications protocol to facilitate determining a location of mobile computing device 200. For example, location acquisition unit 214 may communicate with one or more satellites and/or wireless transmitters in accordance with a Global Navigation Satellite System (GNSS) to determine a location of mobile computing device 200. Location acquisition unit 214 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of mobile computing device 200.

Camera unit 216 may be configured to capture pictures and/or videos. As will be appreciated by those of ordinary skill in the relevant art(s), camera unit 216 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality. In an embodiment, camera unit 216 may be configured to detect changes in a color value corresponding to a particular EM radiation wavelength using one or more integrated image sensors, such that a laser scanning a barcode image displayed on display 212 may be detected. For example, camera unit 216 may be configured to detect red-green-blue (RGB) color intensity values that may be averaged, or otherwise aggregated, over image data received via a lens or other aperture of camera unit 216. Because laser scanners are typically red, camera unit 216 may advantageously measure a rapidly changing 'R' value that may be identified as a trigger condition.

Because camera unit 216 may be configured to detect EM radiation in the visible spectrum, camera unit 216 may detect an intensity and/or wavelength of visible laser light coupled via a lens of camera unit 216. In other words, visible laser light, like ordinary visible light, may be captured by camera unit 216. Camera unit 216 may be configured to measure characteristics of light coupled through its lens, such as an intensity and color (wavelength) by processing one or more characteristics of captured images. That is, camera unit 216 may also detect characteristics of laser light using images generated by camera unit 216 that would ordinarily be utilized in the process of capturing images and/or video.

As will be appreciated by those of ordinary skill in the relevant art(s), any RGB color value, rate of color value change, intensity, rate of intensity change, or any combination thereof, may be used as an intensity threshold in this manner, such that a trigger condition is identified once a suitable color shift and/or intensity shift threshold is exceeded. For example, an 'R' color value (e.g., an R value of 255) may have an associated color value that may be represented in any suitable manner such that a measured R color value has an associated intensity, or brightness, which may be normalized to range between 0 and 1 for images captured when red laser light is coupled via a lens of camera unit 216. An example of an intensity threshold may include, for example, the R value signal intensity changing between a value of 0.50 to a value of 0.60 within a time interval of 100 milliseconds, for example.

In an embodiment, camera unit 216 may be configured to start recording video images into a frame buffer based upon a present state of the mobile computing device 200. For example, upon mobile computing device displaying a barcode image, camera unit 216 may begin recording video, for example, by storing successive images for each frame in a frame buffer. These images may be stored in any suitable memory, such as any suitable portion of memory 206, for example. The frames may then be processed and/or examined by CPU 202 and/or GPU 204 to determine shifts in color and/or intensity of colors in each frame. For example, an average color and average brightness (i.e., intensity) levels over successive frame images may be utilized to detect changes in the characteristics of that particular color component corresponding to a laser scan. In the case of a red laser scanner, this average color of interest may be a red color component value, for example.

In an embodiment, to further increase the chance of identifying a laser scan as a trigger condition, one or more frame buffer images may be cropped to create a point-of-interest (POI). The POI region may be determined, for example, based upon the corresponding region of display 210 in which the barcode image is displayed. As a result, the POI may be determined by using this information to further narrow the region in which shifts in color and/or intensity are expected to occur (e.g., the top half of the image). Once the frame buffer images are cropped in this manner, an average color and average brightness (i.e., intensity) levels of the image in the defined POI may be determined and further examined to detect changes in the characteristics of that particular color component.

In an embodiment, the color component value from a plurality of successive image frames may be stored (e.g., in a suitable portion of memory 206) and each respective color component value compared to previous image frame color component values to determine shifts in the relevant color component value. This same technique may be applied to determine shifts in the average image intensity, or brightness levels.

In an embodiment, image frame color component and/or intensity values may be analyzed over successive frames and compared to changes occurring within a time interval. For example, CPU 202 may be configured to initiate a timer, for example, such that the changes in color and/or intensity values over successive image frames may be compared to a color and/or intensity change threshold. CPU 202 may be configured to start a timer upon camera unit 216 detecting a minimum color value and/or intensity within one of the image frames. Changes to the color value and/or intensity may then be compared to changes in the relevant color component value and/or intensity levels over several frames referenced to time interval as measured by the timer. Using the time interval in this way may further reduce the possibility of incorrectly identifying a trigger condition, thus reducing the occurrence of false positives.

Therefore, by analyzing captured image characteristics over a plurality of successive image frames, such as changes in the average brightness and/or color levels in buffered frame images, for example, various triggers may be identified. Examples of such triggers, again, may be caused by changes in an intensity of laser light over a time interval (which may be associated with laser light within one of a range of wavelengths) changes in a color of laser light over a time interval, etc.

In various embodiments, camera unit 216 may be positioned on the same side of mobile computing device 200 as display 210. This may be the case when, for example, camera unit 216 is implemented as a front-facing mobile computing device camera. Different mobile computing device manufacturers may vary their positioning of front facing cameras in relation to the one or more scanned images displayed on display 210. Therefore, the intensity of laser light measured as the one or more images displayed on display 210 may also vary between mobile computing device manufacturers. Detecting a change in the intensity of laser light over a time interval may reduce some of the variations introduced by different camera locations. However, to further correct for these discrepancies, embodiments also include trigger detect module 207 and/or application module 209 having instructions specifying different intensity thresholds, different color value thresholds, and/or different image display locations for different mobile computing device manufacturers to attempt to identify trigger conditions regardless of the manufacturer of mobile computing device 200.

Furthermore, various embodiments may exploit changes in the measured intensity of laser light based upon the location of scanned images displayed in display 210. For example, display 210 may display two separate barcodes, one being associated with the customer's loyalty rewards information and another being associated with customer payment information. If the loyalty rewards barcode is displayed closer to camera unit 216 than the customer payment information barcode, then trigger detect module 207 may include instructions for two different intensity thresholds. When trigger detect module 207 instructions are executed by CPU 202 and/or GPU 204, CPU 202 and/or GPU 204 may identify whether the loyalty rewards barcode or the customer payment information barcode was scanned.

That is, a first intensity threshold may be associated with a higher threshold value for the loyalty rewards barcode than a second intensity threshold associated with a lower threshold value for the customer payment information. If only the second intensity threshold is exceeded, then CPU 202 and/or GPU 204 may determine that only the customer payment information was scanned. But if the first and second intensity thresholds are exceeded, then CPU 202 and/or GPU 204 may determine that the loyalty rewards barcode was scanned. In this way, two separate triggers may be identified for the two images simultaneously displayed on display 210, thus eliminating the need for a customer to separately select the two different functions within the application.

The following screens illustrated in FIGS. 3A-4H are examples of screens that may be displayed on a mobile computing device once a corresponding application installed on the mobile computing device is launched by a user in accordance with various aspects of the present disclosure. In an embodiment, the screens illustrated in FIGS. 3A-4H may be displayed by any suitable device, such as mobile computing devices 102 and/or 200, as shown in FIGS. 1 and 2, respectively, for example. As will be appreciated by those of ordinary skill in the relevant art(s), the example screens shown in FIGS. 3A-4H are for illustrative purposes, and the functions described herein with respect to each respective screen may be implemented using any suitable format and/or design without departing from the spirit and scope of the present disclosure.

Figures 3A, 3B:
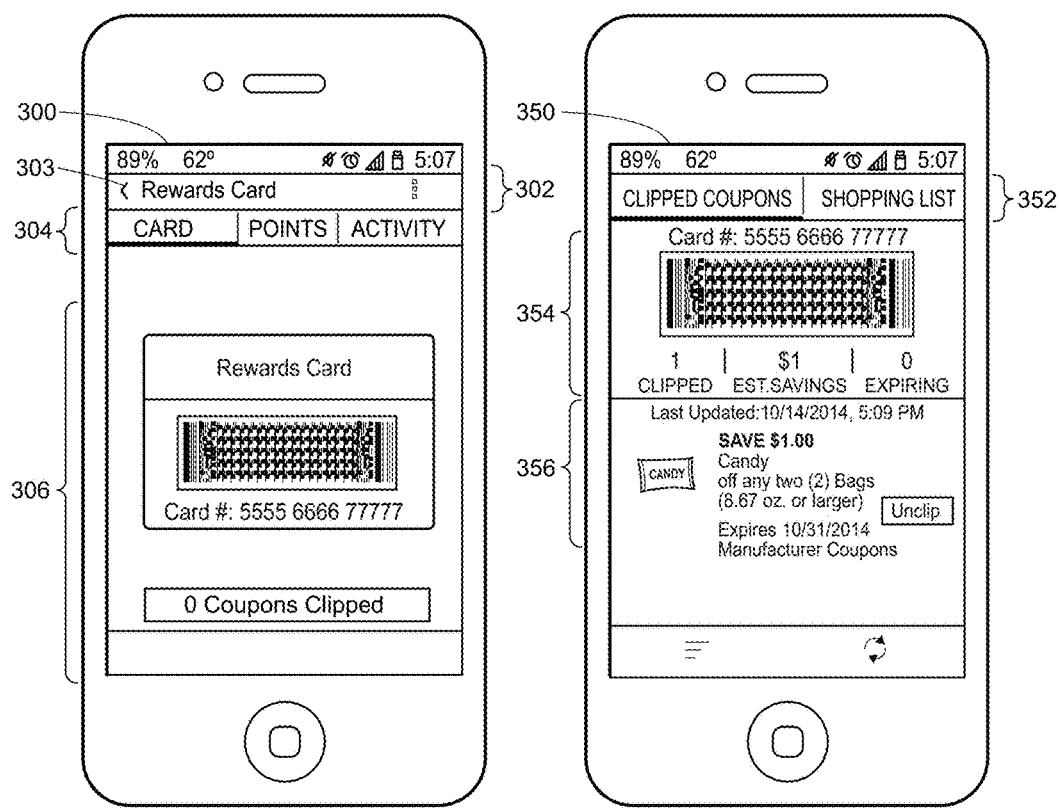
FIG. 3A illustrates an exemplary screen 300 for a mobile computing device displaying an image indicative of a state of the mobile computing device in accordance with an exemplary aspect of the present disclosure.
FIG. 3B illustrates an exemplary screen 350 for a mobile computing device displaying an image indicative of a state of the mobile computing device in accordance with an exemplary aspect of the present disclosure.

Although not shown in FIGS. 3A-3B for purposes of brevity, a main menu may be presented to a user on the mobile computing device displaying any suitable number of interactive icon links representing the various functions supported by the application. Upon a user selecting the corresponding interactive icon link from this main menu, screens 300 and 350 may be presented to the user as shown, for example, in FIGS. 3A-B, respectively. As will be appreciated by those of ordinary skill in the art, the mobile computing device may implement any suitable number of interactive icon links depending on the various functions supported by the application. Some examples of interactive icon links and their corresponding functions may include balance rewards functions (e.g., as shown in FIG. 3A), coupons associated with a customer's account (e.g., as shown in FIG. 3B), store locations, weekly advertisements, online shopping, promotions and offers, application settings, etc.

FIG. 3A illustrates an exemplary screen 300 for a mobile computing device displaying an image indicative of a state of the mobile computing device in accordance with an exemplary aspect of the present disclosure. Screen 300 includes portions 302, 304, and 306. Screen 300 corresponds to a screen displayed upon a user selecting a suitable interactive portion from the application, such as a corresponding interactive icon link, for example, from the main menu. Screen 300 displays information in accordance with a customer's loyalty rewards card. Therefore, the images displayed in screen 300 represent a state of the mobile computing device related to rewards card functions.

Portion 302 may include any suitable graphic, information, label, etc., to facilitate navigation between various portions of the application. Portion 302 may include a navigation bar. For example, upon selection of back arrow 303, the application may return to the main menu or other portion of the application to provide the user with other functions supported by the application.

Portion 304 may include any suitable graphic, information, label, etc., to facilitate navigation of various views within screen 300. For example, as shown in FIG. 3A, tabs "card," "points," and "activity" are shown. A user may select any of these tabs to change the view within the rewards card information displayed by the application. For example, the "card" view as shown in FIG. 3A includes an image of a barcode representative of a customer's rewards card number. The rewards card information associated with the points and activity tabs are not shown in FIG. 3A for purposes of brevity, but may include any suitable indication of the reward points accrued by the customer (points) and/or a history of purchases and/or activities associated with the allocation of the reward points (activity) as part of the customer's profile information.

Portion 306 may include any suitable graphic, information, label, etc., to display the customer's balance reward card information (e.g., a number) as a barcode image. Upon being scanned and recognized by a suitable laser scanner device, the customer's reward card information may be read and identified. Depending on the type of device associated with the laser scanner, reading the rewards card barcode may result in a coupon being credited to the customer's profile information associated with the rewards card number (e.g., if scanned by a coupon dispensing device), loyalty reward points being credited to the customers rewards account for purchases made (e.g., if scanned at a POS terminal), etc. As will be further discussed below with respect to FIGS. 4A-4H, when the laser scan is identified as a trigger condition, the mobile computing device may execute one or more actions, such as displaying a different screen, adjusting images displayed, adjusting display settings, etc.

FIG. 3B illustrates an exemplary screen 350 for a mobile computing device displaying an image indicative of a state of the mobile computing device in accordance with an exemplary aspect of the present disclosure. Screen 350 includes portions 352, 354, and 356. Screen 350 corresponds to a screen displayed upon a user selecting a suitable interactive portion from the application, such as a corresponding interactive icon link, for example, from the main menu. Screen 350 displays functionality in accordance with coupons associated with the customer's loyalty rewards account, which may be associated with the customer's profile information. Therefore, the images displayed in screen 350 represent a state of the mobile computing device related to coupon functions.

Portion 352 may include any suitable graphic, information, label, etc., to facilitate navigation of various views within screen 350. For example, as shown in FIG. 3B, tabs "clipped coupons," and "shopping list" are shown. A user may select any of these tabs to change the view within the coupon information provided by the application. For example, the "clipped coupon" view, as shown in FIG. 3B, includes an image of a barcode representative of a coupon associated with the customer's loyalty rewards account. The shopping list information associated with the shopping list information tab is not shown in FIG. 3B for purposes of brevity, but may include any suitable indication of shopping list items previously selected by the customer either using the application on the mobile computing device, logging in online under the customer's loyalty rewards account, etc.

Portion 354 may include any suitable graphic, information, label, etc., to display one or more coupons (e.g., a coupon code) as barcode images. Upon being scanned and recognized by a suitable laser scanner device, the coupon information may be read, identified, and the appropriate amount deducted from the purchase price of the respective item. As will be further discussed below with respect to FIGS. 4A-4H, when the laser scan is identified as a trigger condition, the mobile computing device may execute one or more actions, such as displaying a different screen, adjusting images displayed, adjusting display settings, etc.

Portion 356 may include any suitable graphic, information, label, etc., to display information corresponding to the coupon barcode image displayed in portion 354. As shown in FIG. 3B, this information may include, for example, a description of the item, expiration dates, etc. Portion 356 may also include one or more interactive portions allowing a customer to "unclip" the coupon, in which case the customer's loyalty rewards account may be updated to remove the coupon.

Although FIGS. 3A-3B illustrate images of rewards card information and a coupon being displayed as separate images, respectively, embodiments include both barcodes being displayed at the same time on a mobile computing device screen. In accordance with such embodiments, the display of mobile computing device may transition based upon which of the two barcode images is scanned. In other words, based upon which of two threshold intensities is exceeded, the mobile computing device may execute different actions. To provide an illustrative example, a mobile computing device may display two images, one representing rewards card information, and the other representing a coupon. If the coupon barcode image is located further from the mobile computing device camera than the rewards card barcode, then a measured laser light scanner intensity exceeding only a first threshold intensity may be interpreted as the coupon being scanned, while a measured laser light scanner intensity exceeding both the first threshold intensity and a second, higher threshold intensity may be interpreted as the rewards card barcode being scanned.

In some embodiments, the application may cause the mobile computing device to execute different actions based upon which barcode is being scanned. For example, if it is determined that the rewards card barcode image is scanned, then the mobile phone may transition to a screen offering additional promotions, which is further discussed below with reference to FIG. 4A. However, continuing this example, if it is determined that the coupon barcode image is scanned, then the mobile phone may transition to a screen informing the customer of different ways to pay for the scanned items for which the coupon was redeemed, which is further discussed below with reference to FIG. 4B.

In some embodiments, the actions executed by the mobile computing device upon identification of a trigger condition may be based upon a current state of the mobile computing device, such as the type of image displayed on the mobile computing device when the trigger condition is identified. However, in other embodiments, the state of the mobile computing device may also include other factors, such as a location of the mobile computing device. In accordance with such embodiments, actions executed by the mobile computing device upon identification of a trigger condition may be based upon a current image displayed on the mobile computing device and the mobile computing device location.

To provide an illustrative example, a mobile computing device may identify a first trigger condition at a first store having a first location and a second trigger condition at a second store having a second location. The mobile computing device may execute one action at the first store location and a different type of action at the second store location, even if the same barcode images are displayed in both stores when each respective trigger condition is identified. Such embodiments may be particularly useful when a retailer wants to more aggressively promote certain products at some stores over other, to collect more in-store experience feedback from certain stores over others, to promote alternative forms of payment at certain stores, etc.

To provide another illustrative example, a mobile computing device may identify a first trigger condition at a first location within a retail store and a second trigger condition at a second location within the retail store. The mobile computing device may execute one action at the first retail store location and a different type of action at the second retail store location, even if the same barcode images are displayed in the retail store when each respective trigger condition is identified. Such embodiments may be particularly useful when a retailer uses the same type of EM radiation (e.g., a laser scanner) for a POS system and a coupon-granting scanner system within the same retail store. In such a case, the mobile computing device may execute one type of action when the first trigger condition is identified at the first location associated with the coupon-granting scanner system, and another, different type of action when the second trigger condition is identified at the second location associated with the POS system.

As will be appreciated by those of ordinary skill in the relevant art(s), mobile computing device 102 may utilize any suitable techniques to determine its location within a retail store and/or to associate its current location with an EM source. For example, mobile computing device 200 may receive communications via communication unit 212 from one or more beacons located at various locations within the retail store, which may be located proximate to each respective EM source. By receiving unique identifiers broadcasted from each of these beacons, mobile computing device 200 may communicate with one or more back-end components, such as back-end components 114, for example, to identify its location and/or a corresponding EM source based upon data stored in back-end components 114 that may reference the unique identifiers accordingly. For example, mobile computing device 200 may implement an iBeacon communication protocol, used by Apple, Inc., to facilitate indoor retail location determination.

Figure 4A:
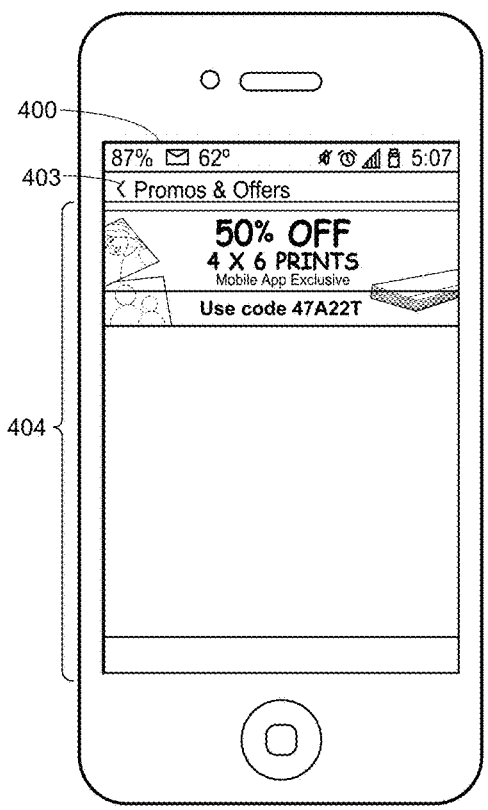
FIG. 4A illustrates an exemplary screen 400 for a mobile computing device displaying a promotional offer in response to an identified trigger condition in accordance with an exemplary aspect of the present disclosure.

FIG. 4A illustrates an exemplary screen 400 for a mobile computing device displaying a promotional offer in response to an identified trigger condition in accordance with an exemplary aspect of the present disclosure. Screen 400 includes portions 402 and 404.

Portion 402 may include any suitable graphic, information, label, etc., to facilitate navigation between various portions of the application. Portion 402 may include a navigation bar such that a user may navigate through different functions provided by the application. For example, upon selection of the back arrow 403 displayed in the navigation bar, as previously discussed with reference to FIG. 3A, for example, the application may return to the main menu or other portion of the application to provide the user with access to other functions supported by the application.

Portion 404 may include any suitable graphic, information, label, etc., to display a promotion offered to the customer. Although the promotion shown in FIG. 4A includes an alphanumeric code for entry by a store employee, those of ordinary skill in the relevant art(s) will appreciate that the promotion may be represented using any suitable identifier, such as a barcode, for example. In an embodiment, screen 400 may be displayed upon a trigger condition being identified. To provide an illustrative example, a customer may launch the application and subsequently choose to display his rewards card (e.g., as shown in FIG. 3A) or a coupon (e.g., as shown in FIG. 3B) for scanning at a register. Upon the corresponding displayed barcode being scanned, the mobile phone camera may measure a change in the intensity of the laser light over an interval of time and/or color (wavelength) of the laser light from the scanner. If the measured change in the intensity of the laser light is greater than an intensity threshold and/or falls within a predetermined range of colors (wavelengths), then the mobile phone may execute an action to transition the display from screen 300 or 350, as shown in FIGS. 3A and 3B, respectively, to screen 400, as shown in FIG. 4A.

This may be particularly useful when a customer is at a POS presenting her rewards card on a mobile phone, since the promotional offer may be automatically presented upon detection of a laser scanning the mobile phone while displaying the rewards card information. This provides a convenient way for the customer to quickly claim a promotional offer without manual input from the customer.

Figure 4B:
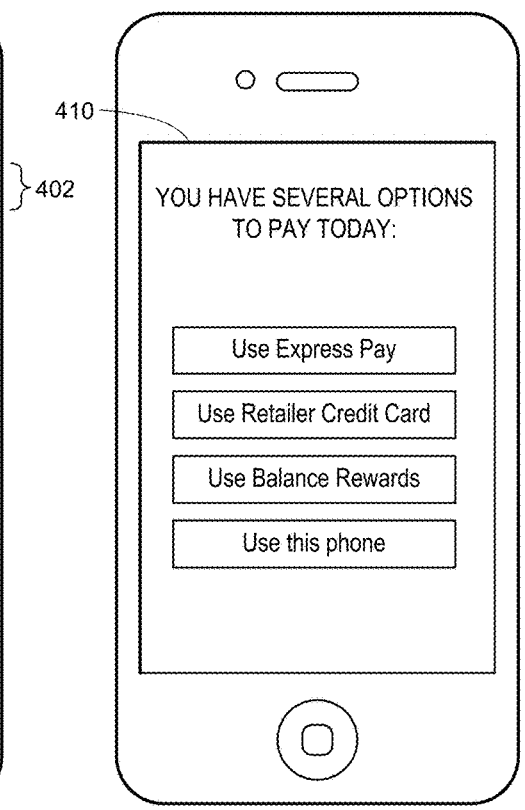
FIG. 4B illustrates an exemplary screen 410 for a mobile computing device displaying a prompt requesting the customer to select a type of payment in response to an identified trigger condition in accordance with an exemplary aspect of the present disclosure.

FIG. 4B illustrates an exemplary screen 410 for a mobile computing device displaying a prompt requesting the customer to select a type of payment in response to an identified trigger condition in accordance with an exemplary aspect of the present disclosure.

Screen 410 may include any suitable graphic, information, label, etc., to present a choice to a customer regarding a payment-related activity. In an embodiment, screen 410 may be displayed upon a trigger condition being identified, such as a displayed barcode (e.g., as shown in FIGS. 3A-B) being scanned by a laser scanner, for example, as previously discussed with reference to FIG. 4A. Although screen 410 includes only four options shown in FIG. 4B, embodiments include the mobile computing device displaying any suitable number of payment options upon the trigger condition being identified.

As shown in FIG. 4B, examples of payment options presented to the customer may include using an Express Pay service, using a retailer-based credit card, redeeming balance reward points to pay for some, or all, of the purchase price, and using one or more payment methods that may be integrated as part of the mobile phone device.

The Express Pay option may include, for example, using a default credit card associated with the customer profile information. For example, upon registering with the retailer's loyalty reward card program or other suitable program, the customer may elect to register a default payment method, (e.g., a debit or credit card) so payments can be processed using the customer's reward card information to access the customer's payment information and subsequently process payments (e.g., via communication between POS 106 and back-end components 114, as shown in FIG. 1).

The retailer credit card information may include, for example, any suitable credit card for which the retailer may have incentives associated with the exchange of balance rewards points. For example, a retailer may offer a certain amount of balance reward points to the customer in exchange for using the retailer credit card for purchases, which may be a greater number that non-retailer credit card or cash purchases. The retailer credit card may be the same credit card registered by the customer as an Express Pay option or a different credit card.

The balance rewards option allows a customer to pay for a portion, or all, of a purchase price by redeeming balance reward points. As will be appreciated by those of ordinary skill in the relevant art(s), a retailer may set any suitable value to balance reward points to facilitate their redemption in such a manner.

The last option shown in FIG. 4B includes an option to allow a customer to use the mobile phone as a payment option. For example, mobile computing devices running the Android mobile operating system integrates Google Wallet™ mobile payment service as a payment system implementing NFC to facilitate payments. To provide another example, mobile computing devices running the Apple iOS mobile operating system utilize Apple Pay mobile payment service as a payment system implementing NFC to facilitate payments. In accordance with various embodiments, screen 410 may include an option, such as the "use this phone" option, for example, to allow the customer to select such a form of payment.

Figure 4C:
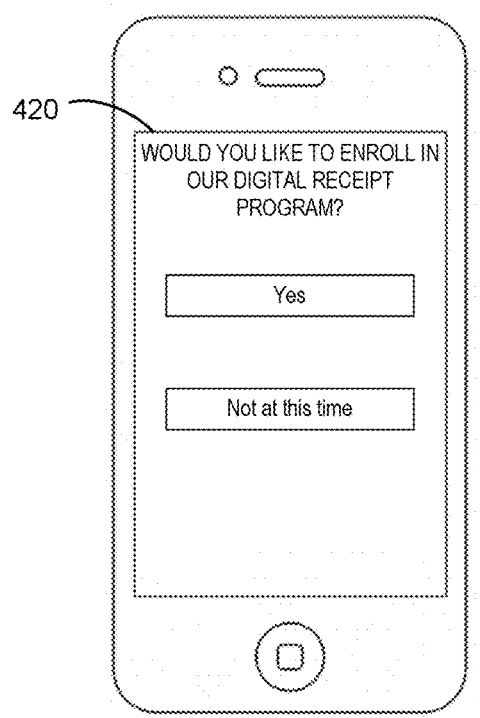
FIG. 4C illustrates an exemplary screen 420 for a mobile computing device displaying a prompt requesting the customer to participate in a digital receipt program in response to an identified trigger condition in accordance with an exemplary aspect of the present disclosure.

FIG. 4C illustrates an exemplary screen 420 for a mobile computing device displaying a prompt requesting the customer to participate in a digital receipt program in response to an identified trigger condition in accordance with an exemplary aspect of the present disclosure.

Screen 420 may include any suitable graphic, information, label, etc., to present a request to a customer regarding participation in a digital receipt program. In an embodiment, screen 420 may be displayed upon a trigger condition being identified, such as a displayed barcode (e.g., as shown in FIGS. 3A-B) being scanned by a laser scanner, for example, as previously discussed with reference to FIG. 4A.

If a customer elects to participate in the digital receipt program, the application may communicate with one or more back-end components, such as back-end components 114, for example, as shown in FIG. 1. The back-end components may then update the customer's information profile indicating this. Furthermore, the back-end components may communicate with a POS, such as POS 106, for example, as shown in FIG. 1, to cause the POS to not print a paper receipt, and instead send the customer a receipt in the form of an email, text message, etc., which may be received by the mobile computing device.

If the customer elects to not participate in the digital receipt program, the application may cause the mobile phone to return to a main menu, the previous screen, or other portion of the application to provide the user with access to other functions.

Figure 4D:
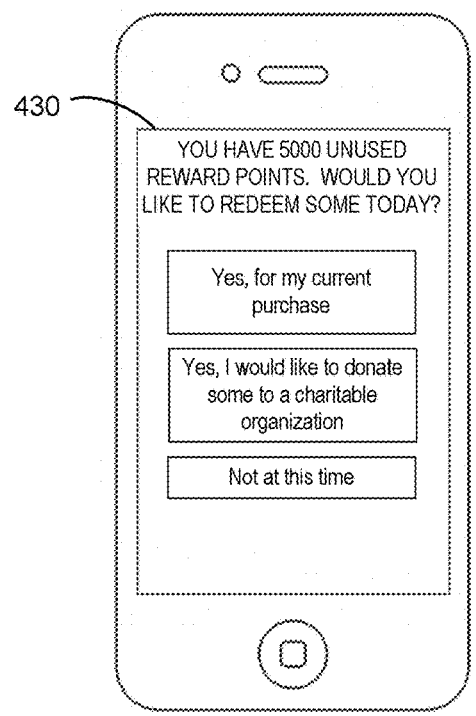
FIG. 4D illustrates an exemplary screen 430 for a mobile computing device displaying a prompt requesting the customer to donate accrued rewards points in response to an identified trigger condition in accordance with an exemplary aspect of the present disclosure.

FIG. 4D illustrates an exemplary screen 430 for a mobile computing device displaying a prompt requesting the customer to donate accrued rewards points in response to an identified trigger condition in accordance with an exemplary aspect of the present disclosure.

Screen 430 may include any suitable graphic, information, label, etc., to present a request to a customer regarding donation of balance reward points to a third party, such as a charitable organization, for example. In an embodiment, screen 430 may be displayed upon a trigger condition being identified, such as a displayed barcode (e.g., as shown in FIGS. 3A-B) being scanned by a laser scanner, for example, as previously discussed with reference to FIG. 4A.

Screen 430 may present a customer with a request to redeem unused reward points. As will be appreciated by those of ordinary skill in the relevant art(s), any suitable number of reward points may be used to cause screen 430 to be displayed to a customer upon identification of one or more or more trigger conditions. Furthermore, any suitable time frame may be used to cause screen 430 to be displayed to a customer, such as an upcoming (e.g., within a month) expiration of reward points, a user having not redeemed reward points over a certain period of time (e.g., the last 3 months), etc.

For example, in some embodiments, if a laser scanner trigger condition is identified, then screen 430 may be displayed if the customer has any number of reward points associated with his customer profile that is greater than zero. In other embodiments, if a laser scanner trigger condition is identified, then screen 430 may be displayed if the user has not redeemed any reward points in the last week, in the last several months, etc. In other embodiments, if a laser scanner trigger condition is identified, then screen 430 may be displayed if the user has unused reward points exceeding a threshold number (e.g., 5000).

In accordance with each of these embodiments, screen 430 may be displayed to allow the customer to make a choice regarding the redemption of the reward points associated with his account. If the customer elects to redeem some (or all) of the reward points for a current purchase, the customer may select this option. However, the customer may also decide to donate a portion (or all) of the reward points to a third-party organization, such as a charity, for example. If the customer elects to not use any reward points, the application may cause the mobile phone to return to a main menu, the previous screen, or other portion of the application to provide the user with access to other functions.

In the case in which the customer elects to use reward points for a current purchase or as a donation, the application may cause the mobile computing device to communicate with one or more back-end components, such as back-end components 114, for example, as shown in FIG. 1, to update the customer's profile information by deducting the applicable number of points specified by the customer. Furthermore, the back-end components may communicate with an appropriate POS system, such as POS 106, for example, such that a suitable monetary value may be deducted from the purchase price of the respective item in exchange for the redeemed reward points.

In the case in which the customer elects to donate some, or all, of the reward points to a third-party, the retailer may assign any suitable monetary value to the reward points such that a donation of reward points may represent a monetary donation of some proportional value.

The selection of how many reward points to redeem, how many reward points to donate, and/or the customer's choice of third-party organizations to donate to may be supported in any suitable manner. For example, the mobile computing device may communicate with one or more back-end components, such as back-end components 114, for example, to provide a customer with access to web-based service that facilitates these choices as provided by the retailer. The prompts, screens, and/or additional selections made by the customer are not shown for purposes of brevity.

Figure 4E:
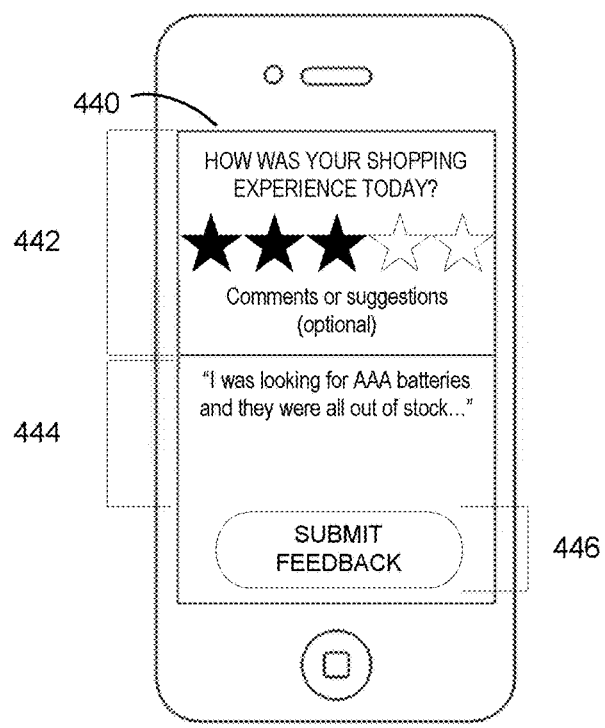
FIG. 4E illustrates an exemplary screen 440 for a mobile computing device displaying a prompt requesting the customer to complete a first type of customer survey in response to an identified trigger condition in accordance with an exemplary aspect of the present disclosure.

FIG. 4E illustrates an exemplary screen 440 for a mobile computing device displaying a prompt requesting the customer to complete a first type of customer survey in response to an identified trigger condition in accordance with an exemplary aspect of the present disclosure. Screen 440 may include any suitable graphic, information, label, etc., to present a request to a customer to submit feedback. In an embodiment, screen 440 may be displayed upon a trigger condition being identified, such as a displayed barcode (e.g., as shown in FIGS. 3A-B) being scanned by a laser scanner, for example, as previously discussed with reference to FIG. 4A.

As shown in FIG. 4E, screen 440 may include portions 442, 444, and 446. As shown in FIG. 4E, portion 442 may include a prompt asking the customer how his shopping experience was at the store. Furthermore, portion 442 may include any suitable rating that may be represented as, or reduced to, an equivalent numerical value, such as a star rating system, a sliding scale of numeric numbers, a grading system, etc. Portion 442 may enable a customer to select a desired rating via an appropriate interaction with the display (e.g., by tapping or touching the appropriate rating desired).

Portion 444 may enable a customer to enter comments or other textual descriptions related to her shopping experience. For example, a customer may utilize an appropriate user interface (e.g., user interface 208) to type the desired text.

Portion 446 may allow a customer to submit the feedback information, which may include the feedback rating entered in portion 442 and/or the text entered in portion 444, to an external computing device. For example, the feedback information may be communicated by the mobile computing device to one or more back-end components, such as back-end components 114, for example, as shown in FIG. 1.

Figure 4F:
FIG. 4F illustrates an exemplary screen 450 for a mobile computing device displaying a prompt requesting the customer to complete a second type of customer survey in response to an identified trigger condition in accordance with an exemplary aspect of the present disclosure.

FIG. 4F illustrates an exemplary screen 450 for a mobile computing device displaying a prompt requesting the customer to complete a second type of customer survey in response to an identified trigger condition in accordance with an exemplary aspect of the present disclosure. Screen 450 may include any suitable graphic, information, label, etc., to present a request to a customer to submit a condensed or short version of feedback. In an embodiment, screen 450 may be displayed upon a trigger condition being identified, such as a displayed barcode (e.g., as shown in FIGS. 3A-B) being scanned by a laser scanner, for example, as previously discussed with reference to FIG. 4A.

Using the previous example discussed with reference to FIG. 4E, screen 450 includes a prompt asking the customer about her experience shopping today, which is a condensed version of a feedback rating compared to the feedback requested in FIG. 4E, for example.

In some embodiments, the feedback request displayed in screen 450 may include a simple binary question regarding whether the customer's experience was "great" or "bad," as shown in FIG. 4E, for example. Again, as will be appreciated by those of ordinary skill in the relevant art(s), any text and/or prompt layout may be utilized to facilitate the collection of this abbreviated form of customer feedback. For example, the displayed prompt may include the 5 stars as shown in FIG. 4E without the text portion, thereby allowing the customer to quickly select a star number that is submitted once selected by the user. To provide another example, the displayed prompt may include three options such as "good," "average" and "bad," etc. In various embodiments, the selection of the appropriate feedback choice by the customer may result in the mobile computing device sending the feedback information to an external computing device. For example, the feedback information may be communicated by the mobile computing device to one or more back-end components, such as back-end components 114, for example, as shown in FIG. 1.

Figures 4G, 4H:
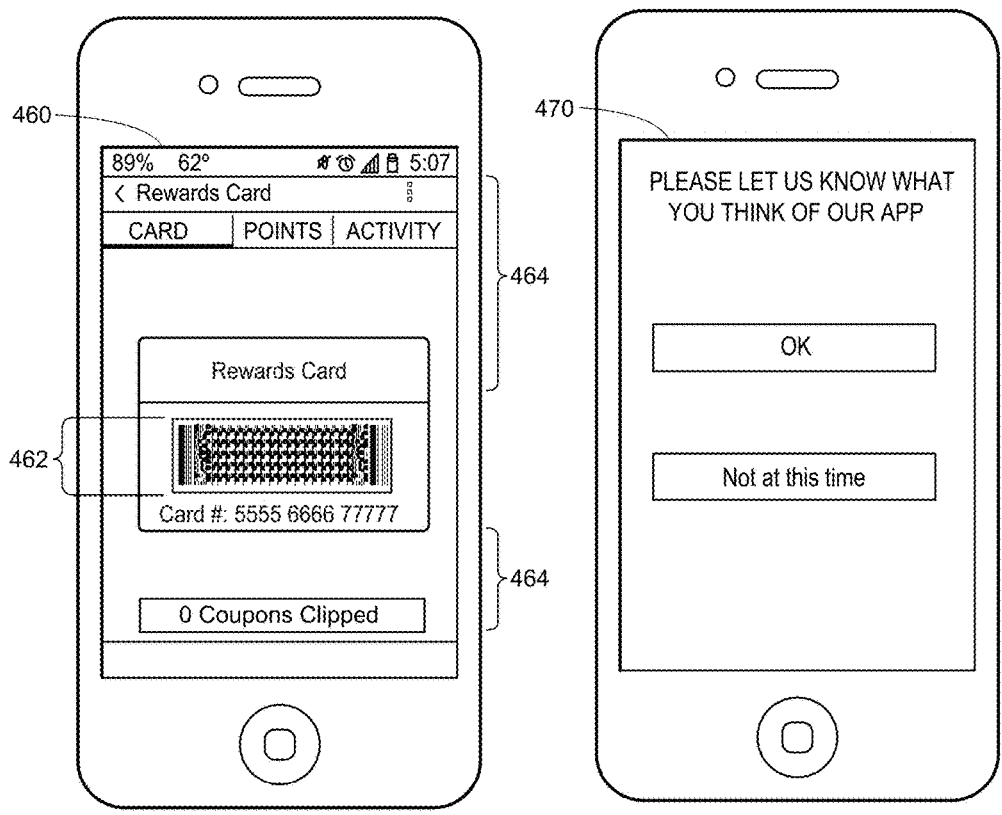
FIG. 4G illustrates an exemplary screen 460 for a mobile computing device displaying an image with adjusted display settings in response to an identified trigger condition in accordance with an exemplary aspect of the present disclosure.
FIG. 4H illustrates an exemplary screen 470 for a mobile computing device displaying a prompt requesting the customer to submit feedback regarding the application in response to an identified trigger condition in accordance with an exemplary aspect of the present disclosure.

FIG. 4G illustrates an exemplary screen 460 for a mobile computing device displaying an image with adjusted display settings in response to an identified trigger condition in accordance with an exemplary aspect of the present disclosure. Screen 460 may include any suitable graphic, information, label, etc., to present a barcode using adjusted display settings so the barcode may be more easily scanned by a laser scanner device. In an embodiment, screen 460 may be displayed upon a trigger condition being identified, such as a displayed barcode (e.g., as shown in FIGS. 3A-B) being scanned by a laser scanner, for example, as previously discussed with reference to FIG. 4A.

For example, screen 460 may initially display the same image as screen 300, as shown in FIG. 3A, which is an image of a barcode representative or a loyalty rewards program. Continuing this example, the image as shown in screen 300 may be displayed on the mobile computing device in accordance with a first set of display settings (e.g., default display or current display settings). To provide an illustrative example, as previously discussed with reference to FIG. 4A, a customer may launch the application and subsequently choose to display his rewards card (e.g., as shown in FIG. 3A) or a coupon (e.g., as shown in FIG. 3B) for scanning at a register. Upon an attempt to scan the corresponding displayed barcode image, the mobile phone camera may measure the intensity and/or color (wavelength) of the laser light from the scanner. If the measured laser light intensity is greater than an intensity threshold and/or within a predetermined range of colors (wavelengths), then the mobile phone may execute an action to change the display settings to optimize or otherwise allow for the laser to more easily scan the displayed barcode image. In this way, a laser scanner may initially have trouble reading the displayed barcode image, but then successfully read the displayed barcode image once the display settings are adjusted.

In some embodiments, the application may change the display settings by adjusting settings such as the contrast, brightness, etc., such that images displayed on the screen are adjusted in the same manner. That is, the entire displayed screen may be brightened, for example, to allow a laser scanner to better detect a displayed image.

In other embodiments, however, the application may change the display settings by making the displayed barcode image more prominent than other portions of the screen. For example, screen 460 includes a barcode image portion 462 and the remaining screen portions 464. In accordance with an embodiment, upon identification of a trigger condition, the application may cause portion 462 to be enhanced or emphasized while deemphasizing the remaining portions 464. As will be appreciated by those of ordinary skill in the relevant art(s), the process of emphasizing portion 462 while deemphasizing remaining portions 464 may be performed in any suitable manner, such as maintaining the initial display brightness, color, and/or contrast of portion 462 while darkening remaining portions 464, for example, as shown in FIG. 4G.

FIG. 4H illustrates an exemplary screen 470 for a mobile computing device displaying a prompt requesting the customer to submit feedback regarding the application in response to an identified trigger condition in accordance with an exemplary aspect of the present disclosure. Screen 470 may include any suitable graphic, information, label, etc., to present a prompt asking the customer to rate the application. If the customer elects the option to rate the application ("OK") then the application may cause the mobile computing device to communicate with one or more back-end components, such as back-end components 114, for example, as shown in FIG. 1.

The customer feedback used to rate the application may include any suitable numeric and/or text, which may be similar to the customer feedback solicited using prompts shown in FIG. 4E, for example. In some embodiments, the customer feedback may be communicated to the retailer via one or more back-end components. In other embodiments, the customer feedback may be entered and submitted via an application external to the application executed on the mobile computing device. As will be appreciated by those of ordinary skill in the relevant art(s), upon electing to submit feedback related to the application, the application may cause the mobile computing device to redirect the customer from screen 470 to a feedback system used in conjunction with a mobile OS system. For example, the application may redirect the customer to a feedback rating system used by the Android Google Play store, a feedback rating system used by the Apple App Store, etc.

Figure 5:
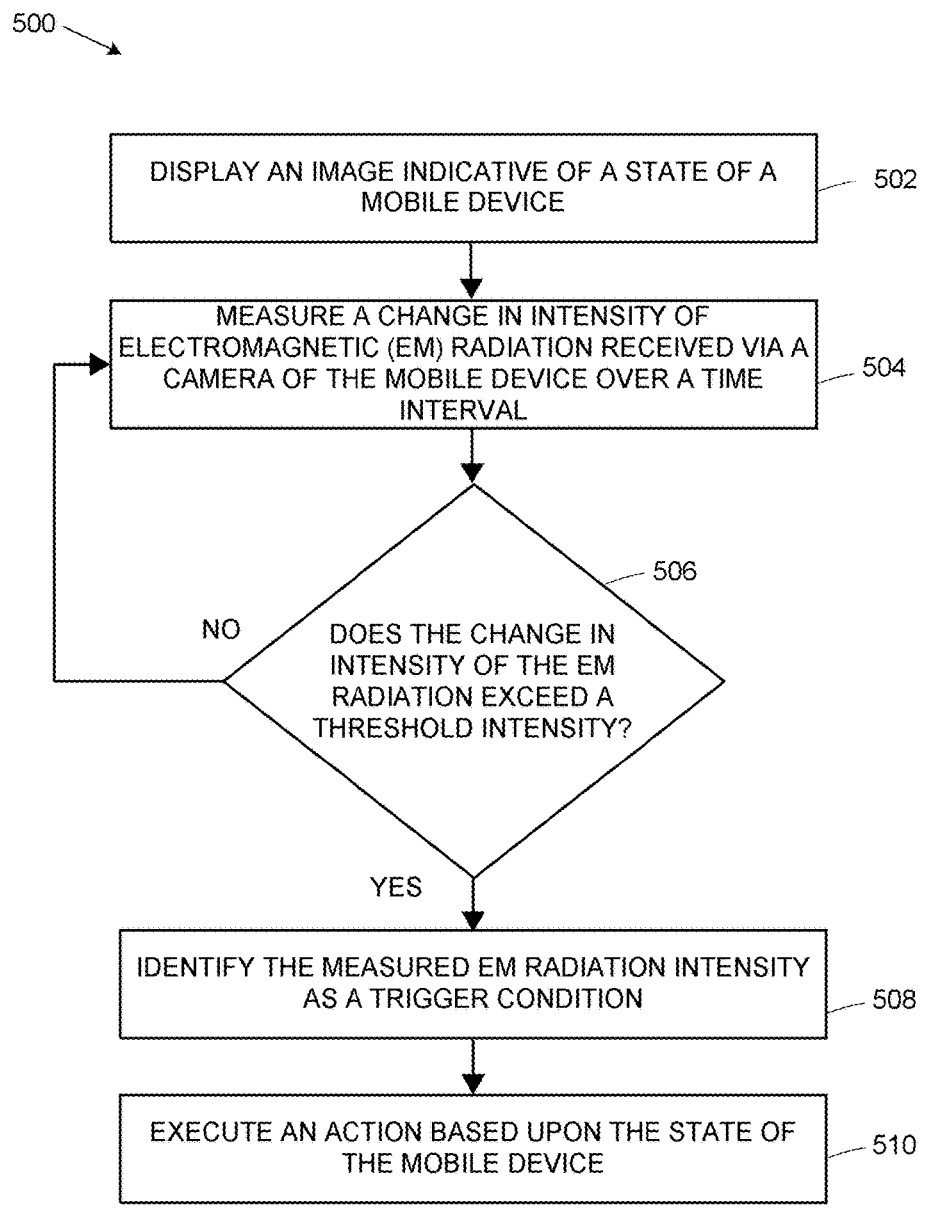
FIG. 5 illustrates an exemplary method 500 in accordance with an exemplary aspect of the present disclosure.

FIG. 5 illustrates an exemplary method 500 in accordance with an exemplary aspect of the present disclosure. In an embodiment, method 500 may be implemented by any suitable device, such as mobile computing device 102 and/or mobile computing device 200, for example, as shown in FIGS. 1 and 2, respectively. In an embodiment, method 500 may be performed by any suitable combination of one or more processors, applications, algorithms, and/or routines, such as any CPU 202 and/or GPU 204 executing instructions stored in memory 206 in conjunction with user input received via user interface 208, for example.

Method 500 may start when an image indicative of a state of a mobile computing device displayed on a mobile computing device (block 502). This may include, for example, a user launching an application installed on the mobile computing device, that is in turn executed by CPU 202 and/or GPU 204 reading instructions stored in application module 209, for example, as shown in FIG. 2. The image may include, for example, a barcode image representative of a loyalty rewards number or a coupon, as previously discussed with reference to FIGS. 3A and 3B, respectively.

Method 500 may include one or more processors measuring a change in an intensity of EM radiation over a time interval received via a camera of the mobile computing device (block 504). This EM radiation may include, for example, laser light emitted from a laser scanner used by a store employee. The laser scanner may be used by the store employee in conjunction with a checkout process, as part of a promotional offer to associate one or more coupons, offers, and/or promotions with a customer's information profile by scanning a rewards card barcode image, etc. The laser light may be measured using one or more portions of the camera components integrated as part of the mobile computing device. Measuring the change in intensity of the laser light may include, for example, measuring a change in color intensity signal value over the time interval, as previously discussed with reference to FIG. 2.

Method 500 may include one or more processors determining whether the measured change in the intensity of the EM radiation over the time interval (block 504) exceeds a threshold intensity value (block 506). If so, then method 500 may continue (block 508). Otherwise, method 500 may continue to measure the change in intensity of EM radiation over additional subsequent time intervals (block 504).

Method 500 may include one or more processors identifying the change in the measured intensity of the EM radiation (block 504) exceeding a threshold value (block 506) as a trigger condition (block 508). This may include, for example, CPU 202 and/or GPU 204 executing instructions stored in application module 209, for example, as shown in FIG. 2, to determine that an action is to be executed.

Method 500 may include one or more processors executing an action based upon the state of the mobile computing device (block 510). This action may include, for example, the mobile computing device display screen transitioning to another screen that is different that the initial image that was displayed (block 502). This could include, for example, any of the screen transitions as discussed with reference to FIGS. 4A-H.

As used herein, the terms "customer" or "user" are interchangeable and may refer to a person who is purchasing products, goods, or services at a retail store.

As used herein, the term "employee" may refer to a person who is employed by the retail store.

It will be appreciated that various embodiments of the system and methods described herein allow, among other advantages, a method for detecting light via a camera on a mobile computing device. Because the detection is based on a specific characteristic of the light and not the quality of the image being scanned, it may allow uses of retail applications on mobile phones to become more reliable.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

What is claimed is:

1. A method in a mobile computing device, comprising:
displaying, by one or more processors of the mobile computing device, a first image indicative of a state of the mobile computing device;
measuring, by one or more processors of the mobile computing device, a change in intensity of electromagnetic (EM) radiation received via a camera of the mobile computing device over a time interval;
identifying, by one or more processors of the mobile computing device, satisfaction of a trigger condition when the change in intensity of the EM radiation over the time interval exceeds a threshold intensity; and
displaying, by one or more processors of the mobile computing device, a second image indicative of a choice presented to a customer regarding a payment-related activity that is based upon the state of the mobile computing device when the trigger condition is satisfied.

2. The method of claim 1, wherein the EM radiation includes laser light emitted from a laser scanner.

3. The method of claim 1, wherein the act of identifying the satisfaction of the trigger condition further comprises:
identifying, by one or more processors of the mobile computing device, the satisfaction of the trigger condition when a wavelength of the EM radiation is within a predetermined range of wavelengths.

4. The method of claim 1, wherein the act of displaying the second image further comprises:
displaying the second image based on a location of the mobile computing device within a retail store.

5. The method of claim 1, wherein the payment-related activity includes one or more of:
a promotional offer;
a request for the customer to make a donation to a charity;
use of the customer's rewards points; and
selecting a type of payment.

6. The method of claim 1, wherein the payment-related activity includes one or more of:
a request for the customer to participate in a digital-receipt program; and
a request for the customer to participate in a survey regarding the customer's in-store experience.

7. The method of claim 1, wherein:
the first image includes a first and a second barcode,
the act of identifying the trigger condition comprises:
identifying a first trigger condition associated with the first barcode that is satisfied when the change in intensity of the EM radiation over the time interval exceeds a first threshold intensity; and
identifying a second trigger condition associated with the second barcode that is satisfied when the change in intensity of the EM radiation exceeds a second threshold intensity that is greater than the first threshold intensity, and
the act of displaying the second image comprises:
displaying the second image when the first trigger condition is satisfied.

8. The method of claim 7, further comprising:
displaying a third image that is different than the second image when the second trigger condition is satisfied.

9. The method of claim 1, wherein the first image includes one of a first barcode or a second barcode, and
wherein the act of displaying the second image includes displaying one of two different images based upon whether the first or the second barcode was being displayed when the trigger condition is satisfied.

10. A system, comprising:
a laser scanner configured to generate laser light; and
a mobile computing device configured to (i) display an image indicative of a state of the mobile computing device, (ii) measure a change in an intensity of the laser light over a time interval and a wavelength of the laser light received via a camera associated with the mobile computing device while the image is being displayed, and (iii) execute an action in response to the change in the intensity of the laser light exceeding a threshold intensity over the time interval and the wavelength of the laser light being within a predetermined range of wavelengths.

11. The system of claim 10, wherein the mobile computing device is further configured to execute the action based on a location of the mobile computing device.

12. The system of claim 10, wherein the mobile computing device is configured to display images in accordance with a default display setting and an adjusted display setting, and to execute the action by displaying the image indicative of the state of the mobile computing device using the adjusted display settings that are different than the default display settings.

13. The system of claim 10, wherein the action includes displaying another image indicative of a choice regarding a payment-related activity.

14. The system of claim 13, wherein the payment-related activity includes one or more of:
a promotional offer;
a request for a customer to make a donation to a charity;
use of a customer's rewards points; and
selecting a type of payment.

15. The system of claim 10, wherein the mobile computing device is further configured to:
display another image indicative of a request for a customer to participate in one or more of:
a digital-receipt program; and
a survey regarding the customer's in-store experience.

16. The system of claim 10, wherein the image includes a first and a second barcode, and wherein the mobile computing device is further configured to:
identify a first trigger condition associated with the first barcode that is satisfied when the change in laser light intensity exceeds a first threshold intensity and the wavelength of the laser light is within the predetermined range of wavelengths;
identify a second trigger condition associated with the second barcode that is satisfied when the change in laser light intensity exceeds a second threshold intensity that is greater than the first threshold intensity and the wavelength of the laser light is within the predetermined range of wavelengths; and
execute the action and another action, respectively, when the first and the second trigger conditions are satisfied.

17. A non-transitory computer readable media having instructions stored thereon in a mobile computing device, that when executed by a processor cause the processor to:
display a first image indicative of a state of the mobile computing device;
measure electromagnetic (EM) radiation received via a camera of the mobile computing device;
identify satisfaction of a trigger condition when a change in an intensity of the EM radiation over a time interval exceeds a threshold intensity; and
display a second image indicative of a choice presented to a customer regarding a payment-related activity that is based upon the state of the mobile computing device when the trigger condition is satisfied.

18. The non-transitory computer readable media of claim 17, wherein the EM radiation includes laser light emitted from a laser scanner.

19. The non-transitory computer readable media of claim 17, wherein the instructions to identify the trigger condition further cause the processor to:
identify the satisfaction of the trigger condition when a wavelength of the EM radiation is within a predetermined range of wavelengths.

20. The non-transitory computer readable media of claim 17, wherein the instructions to display the second image further cause the processor to:
display the second image based on a location of the mobile computing device.

21. The non-transitory computer readable media of claim 17, wherein the payment-related activity includes one or more of:
a promotional offer;
a request for the customer to make a donation to a charity;
use of the customer's rewards points; and
selecting a type of payment.

22. The non-transitory computer readable media of claim 17, wherein the payment-related activity includes one or more of:
a request for the customer to participate in a digital-receipt program; and
a request for the customer to participate in a survey regarding the customer's in-store experience.

23. The non-transitory computer readable media of claim 17, wherein the first image includes a first and a second barcode, and
wherein the instructions to identify the trigger condition further cause the processor to:
identify a first trigger condition associated with the first barcode that is satisfied when the change in the intensity of the EM radiation exceeds a first threshold intensity;
identify a second trigger condition associated with the second barcode that is satisfied when the change in the intensity of the EM radiation exceeds a second threshold intensity that is greater than the first threshold intensity, and wherein the instructions to display the second image further cause the processor to:
  display the second image when the first trigger condition is satisfied.

24. The non-transitory computer readable media of claim 23, further including instructions that, when executed by a processor, cause the processor to:
  display a third image that is different than the second image when the second trigger condition is satisfied.

25. The non-transitory computer readable media of claim 17, wherein the first image includes one of a first barcode or a second barcode, and
  wherein the instructions to display the second image further cause the processor to display one of two different images based upon whether the first or the second barcode was being displayed when the trigger condition is satisfied.

26. A mobile computing device, comprising:
  a display unit configured to display a first image indicative of a state of the mobile computing device;
  a camera unit configured to receive electromagnetic (EM) radiation; and
  a central processing unit (CPU) configured to:
    measure a change in intensity of the received electromagnetic (EM) radiation over a time interval;
    identify satisfaction of a trigger condition when the change in intensity of the EM radiation over the time interval exceeds a threshold intensity; and
    display a second image indicative of a choice presented to a customer regarding a payment-related activity that is based upon the state of the mobile computing device when the trigger condition is satisfied.

27. The mobile computing device of claim 26, wherein the EM radiation includes laser light emitted from a laser scanner.

28. The mobile computing device of claim 26, wherein the CPU is further configured to identify the satisfaction of the trigger condition when a wavelength of the EM radiation is within a predetermined range of wavelengths.

29. The mobile computing device of claim 26, wherein the CPU is further configured to display the second image based on a location of the mobile computing device within a retail store.

30. The mobile computing device of claim 26, wherein the payment-related activity includes one or more of:
  a promotional offer;
  a request for the customer to make a donation to a charity;
  use of the customer's rewards points; and
  selecting a type of payment.

31. The mobile computing device of claim 26, wherein the payment-related activity includes one or more of:
  a request for a customer to participate in one or more of:
    a digital-receipt program; and
    a request for the customer to participate in a survey regarding the customer's in-store experience.

32. The mobile computing device of claim 26, wherein:
  the first image includes a first and a second barcode, and
  the CPU is further configured to (i) identify a first trigger condition associated with the first barcode that is satisfied when the change in intensity of the EM radiation exceeds a first threshold intensity, (ii) identify a second trigger condition associated with the second barcode that is satisfied when the change in intensity of the EM radiation exceeds a second threshold intensity that is greater than the first threshold intensity, and (iii) display the second image when the first trigger condition is satisfied.

33. The mobile computing device of claim 32, wherein the CPU is further configured to display a third image that is different than the second image when the second trigger condition is satisfied.

34. The mobile computing device of claim 26, wherein the first image includes one of a first barcode or a second barcode, and
  wherein the CPU is further configured to display the second image as one of two different images based upon whether the first or the second barcode was being displayed when the trigger condition is satisfied.

35. A method for facilitating state-based changes on a web-enabled mobile computing device with an application executed on the web-enabled mobile computing device, comprising:
  causing a display unit of the web-enabled mobile computing device to display a first image indicative of a state of the mobile computing device;
  receiving electromagnetic (EM) radiation at the web-enabled mobile computing device via a camera of the mobile computing device;
  causing a processor of the web-enabled mobile computing device to measure a change in intensity of EM radiation over a time interval;
  causing a processor of the web-enabled mobile computing device to identify satisfaction of a trigger condition when the change in intensity of the EM radiation over the time interval exceeds a threshold intensity; and
  causing a processor of the web-enabled mobile computing device to display a second image indicative of a choice presented to a customer regarding a payment-related activity that is based upon the state of the web-enabled mobile computing device when the trigger condition is satisfied.

36. The method of claim 35, wherein the EM radiation includes laser light emitted from a laser scanner.

37. The method of claim 35, further comprising:
  causing the processor to identify the satisfaction of the trigger condition when a wavelength of the EM radiation is within a predetermined range of wavelengths.

38. The method of claim 35, further comprising:
  causing the processor to display the second image based on a location of the web-enabled mobile computing device within a retail store.

39. The method of claim 35, wherein the payment-related activity includes one or more of:
  a promotional offer;
  a request for the customer to make a donation to a charity;
  use of the customer's rewards points; and
  selecting a type of payment.

40. The method of claim 35, wherein the payment-related activity includes one or more of:
  a request for a customer to participate in a digital-receipt program; and
  a request for a customer to participate in a survey regarding the customer's in-store experience.

41. The method of claim 35, wherein the first image includes a first and a second barcode, and further comprising:
  causing the processor to (i) identify a first trigger condition associated with the first barcode that is satisfied when the change in intensity of the EM radiation exceeds a first threshold intensity, (ii) identify a second trigger condition associated with the second barcode that is satisfied when the change in intensity of the EM radiation exceeds a second threshold intensity that is greater than the first threshold intensity, and (iii) display the second image when the first trigger condition is satisfied.

42. The method of claim 41, further comprising:
causing a processor of the web-enabled mobile computing device to display a third image that is different than the second image when the second trigger condition is satisfied.

43. The method of claim 35, wherein the first image includes one of a first barcode or a second barcode, and wherein the act of causing the processor to display the second image includes displaying one of two different images based upon whether the first or the second barcode was being displayed when the trigger condition is satisfied.

* * * * *